United States Patent [19]

Lin

[11] 3,846,829

[45] Nov. 5, 1974

[54] READ-WRITE SERVO TRACK COPY SYSTEM

[75] Inventor: Frank W. Lin, Cupertino, Calif.

[73] Assignee: Caelus Memories, Inc., San Jose, Calif.

[22] Filed: Nov. 6, 1972

[21] Appl. No.: 303,794

[52] U.S. Cl. .................................................. 360/46
[51] Int. Cl. .................................................. G11b 5/44
[58] Field of Search 340/174.1 A, 174.1 B, 174.1 H, 340/174.1 G, 174.1 P; 179/100.2 E; 360/46

[56] References Cited

UNITED STATES PATENTS

| | | | |
|---|---|---|---|
| 3,243,580 | 3/1966 | Welsh | 340/174.1 H |
| 3,474,427 | 10/1969 | Stevens | 340/174.1 A |
| 3,715,738 | 2/1973 | Kleist | 340/174.1 H |
| 3,719,934 | 3/1973 | Behr | 340/174.1 H |
| 3,735,372 | 5/1973 | Coccagna | 340/174.1 H |

*Primary Examiner*—Vincent P. Canney
*Attorney, Agent, or Firm*—Lindenberg, Freilich, Wasserman, Rosen & Fernandez

[57] ABSTRACT

A servo track transcribing system in which a servo track, magnetized in one direction except for discrete spaced interrupting designations which are magnetized in the other direction, is read out. It is peak detected to provide for each designation a signal with a first peak corresponding to the front edge of the designation and a second peak of opposite polarity corresponding to the rear edge of the designation. A zero crossing detector provides first and second zero crossing pulses for each signal. The signal amplitude is compared with two reference levels to define a time interval during which an AND gate is enabled. The gate passes only the second zero crossing pulse which is time delayed to provide a delayed pulse. The second zero crossing pulse and the delayed pulse are ORed by an OR gate which provides a pair of spaced pulses. The latter are used to control the directions of current flow in a write head positioned adjacent a magnetic track in which the original servo track is transcribed.

8 Claims, 6 Drawing Figures

READ-WRITE SERVO TRACK COPY SYSTEM

BACKGROUND OF THE INVENTION

1. Field of the Invention:

The present invention generally relates to data transcribing and, more particularly, to a system and method for recording servo tracks for use in a track-following servo system.

2. Description of the Prior Art:

The ever increasing trend toward high density data recording in data storage systems, in which data is recorded in closely spaced data tracks, has led to the development of various track-following servo systems. Such systems are needed to insure the accurate positioning of read/write transducers or heads with respect to the desired tracks. U.S. Pat. No. 3,534,344 describes a method and apparatus for recording and detecting information useful for such a track-following servo system. Basically, servo tracks are recorded on a servo disk, which forms part of a disk file, containing data disks. All the disks are mounted to rotate about a fixed axis of rotation. The radial distance of the path between each pair of adjacent servo tracks from the center of rotation corresponds to the radial distance from the center of a different data track to the center of rotation.

In operation to position an appropriate head at a given data track the carriage assembly, to which the head and a servo head are physically connected, is moved so that the servo head is at the path between a particular pair of adjacent servo tracks. As the servo head reads the servo information in the two tracks, its output is used to generate an error signal which drives the carriage until the servo head is exactly over the path between the adjacent servo tracks. At such time the head is exactly over the desired data track.

The servo tracks in said patent are of two types and are designated as odd and even. The path between each pair of adjacent tracks is located between two different types of tracks. That is, each path has an odd track on one side and an even track on the other side. Each odd track is magnetized in one direction (+) with interrupted portions or designations magnetized in the other direction (−), while the even track is magnetized in the (−) direction interrupted by (+) designations. For proper operation it is important that the number of designations in each track be equally spaced from one another.

The task of producing an acceptable servo disk with a large number of tracks is difficult and expensive due to the large percentage of rejects. This problem can be overcome if a system and method were developed to enable a previously recorded acceptable servo disk to be used as a master from which other servo disks could be produced. In such a system information in an accurately recorded servo track could be readout to drive a write head in order to successively record corresponding servo tracks on another servo disk.

Attempts to produce a servo disk by such a method in which conventional read/write techniques were used have not been successful. The main reason for the failure is that spurious pulses are generated during the read/write operation. These pulses often produce erroneous additional designations in the recorded servo tracks and therefore the produced servo disks did not meet desired acceptable standards. Thus, a need exists for a system and method for recording servo tracks from a previously recorded servo track. Alternately stated, a need exists for a system capable of reading out servo information contained in a servo track which is magnetized in one direction except for interrupted designations which are magnetized in an opposite direction, and which is further capable of utilizing the readout information to record the same information on another servo track on the same or another disk.

OBJECTS AND SUMMARY OF THE INVENTION

It is a primary object of the present invention to provide improvements in the production of servo disks.

Another object of the present invention is to provide a system for recording a servo track from a previously recorded servo track.

A further object of the present invention is to provide a system and method for faithfully reproducing a track magnetized in one direction except for interrupting portions magnetized in an opposite direction.

These and other objects of the invention are achieved in a system in which the servo track to be reproduced is readout to produce a signal for each interrupting designation, magnetized in a direction opposite to the rest of the track. The signal is used to generate a pulse which is permitted to pass to an OR gate and is also time delayed to produce a corresponding pulse which is also supplied to the OR gate. The output of the latter is therefore a pair of pulses for each readout signal. These pairs of pulses which are produced successively are used to control a write head driver. The first pulse of each pair causes the head to magnetize a servo track, passing thereby, in one direction until the second pulse of the pair is received causing a change in the magnetization direction to the other direction until the first pulse of a succeeding pair of pulses is received.

DETAILED DESCRIPTION OF THE PREFERRED EMBODIMENTS

Figure 1:
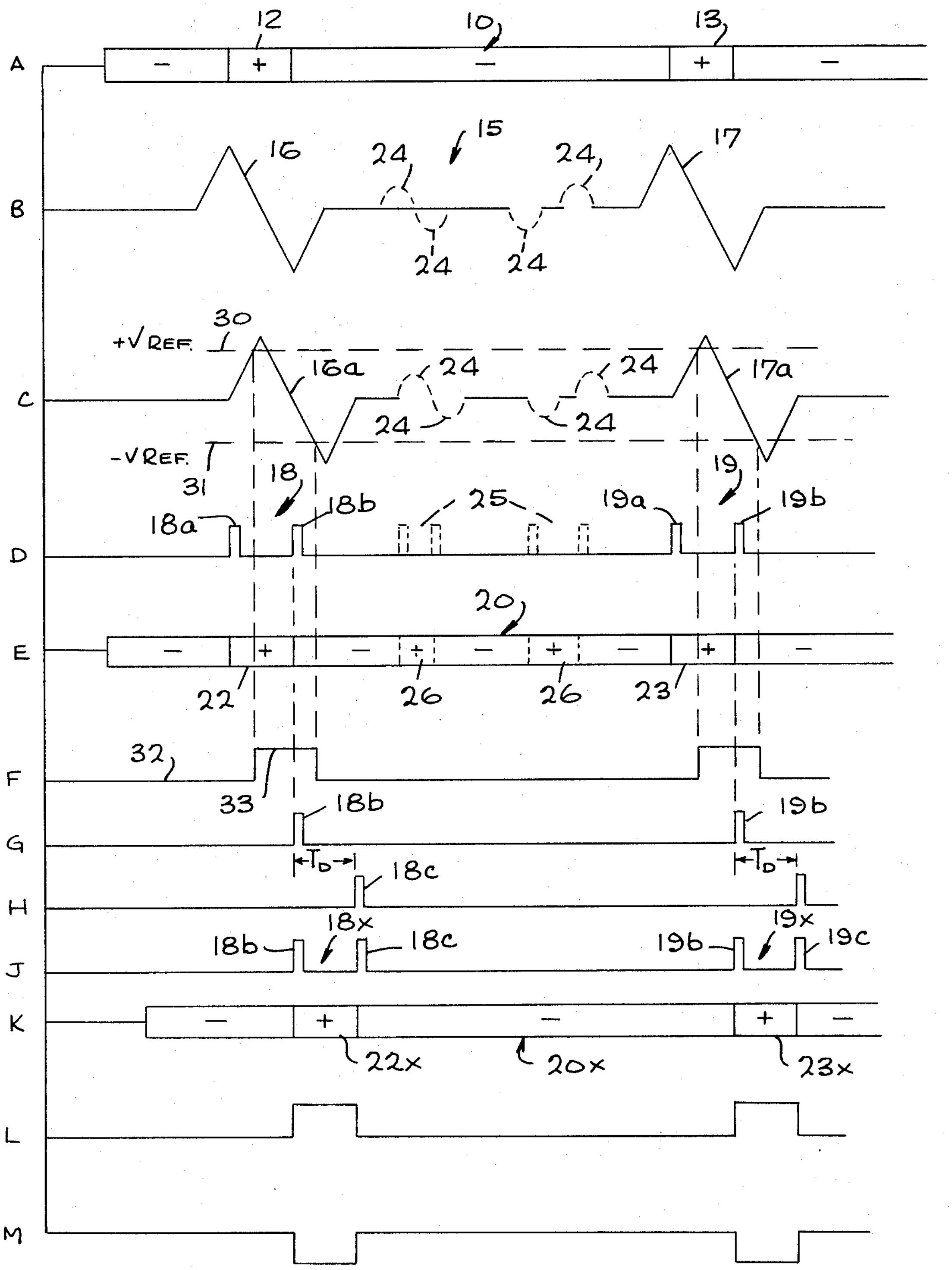
FIG. 1 is a multiline waveform diagram useful in explaining the present invention, and problems associated with prior art systems.

The present invention and its advantages may best be explained by first describing in connection with FIG. 1 the problems encountered when an attempt is made with conventional means to use an existing servo track to record one or more servo tracks therefrom. Numeral 10 in FIG. 1A desinates a servo track generally magnetized in one direction, designated by (−), except for spaced interrupting designations, magnetized in the opposite direction and designated by (+). The two designations shown in FIG. 1A are designated by numerals 12 and 13. Such a track is referred to as the even track in the aforementioned patent and is designated therein by numeral 36 in FIG. 2. When the information in the track or simply the track is readout the output is as shown by the solid line waveform 15 in FIG. 1B. Basically, this waveform includes signals 16 and 17 produced as a result of designations 12 and 13, respectively. When waveform 15 is peak detected (FIG. 1C) and threshold detected such as by a zero crossing detector the output of the latter is a sequence of pulses as shown in FIG. 1D. Therein numeral 18 designates a pair of pulses 18a and 18b produced in response to signal 16*a* which corresponds to signal 17, while numeral 19 designates a pair of pulses 19*a* and 19*b*, produced in response to signal 17*a* which corresponds to signal 17.

This sequence of pulses can be supplied to a switch to control a write driver so that when the first pulse of each pair is received the write head magnetizes a passing magnetic track in the (+) direction, and when the second pulse of each pair is received it magnetizes the track in the (−) direction until the first pulse of the next pair is received. The resulting track would be as shown in solid lines in FIG. 1E, which is designated by numeral 20 and is a replica of track 10. Track 20 is shown including designations 22 and 23.

Unfortunately, such a simple performance does not occur in practice. Since the short designation 12 and 13 (FIG. 1A) are separated by relatively large portions of the track, during the quiescent period between signals 16 and 17 noise in the peak detector and/or the zero crossing detector often produce spurious waveform distortions, represented in FIGS. 1B and 1C by dashed lines 24. Consequently, the zero crossing detector in addition to producing the desired pairs of pulses 18 and 19 produces spurious pulses 25 in its output pulse sequence. These affect the switching of the track magnetization directions and thereby cause spurious designations 26 to be produced in the track.

The problem created by the spurious pulses 25 which result in the production of the spurious designations 26 is eliminated by the present invention. Basically, in the present invention the output of the peak detector (FIG. 1C) is supplied to a comparator circuit with a $+V_{REF}$ and a $-V_{REF}$ reference levels, designated in FIG. 1C by dashed lines 30 and 31, respectively, Initially, the comparator is reset to provide a false (low) output as designated by line 32 in FIG. 1F. Then when the amplitude of the peak detected signal 16*a* exceed $+V_{REF}$ the comparator is set to provide a true (high) output 33 until the amplitude of signal 16*a* drops below $-V_{REF}$ when the comparator is again reset. Since none of the spurious signals 24 exceeds either reference level the comparator remains reset until the amplitude of signal 17*a* exceeds $+V_{REF}$ when the comparator is again set as indicated by line 34.

Each true output of the comparator is used to define an interval during which pulses from the zero crossing detector (FIG. 1D) are permitted to pass to an OR gate while the rest of the pulses occurring when the comparator output is false are blocked out. In the particular example only pulse 18*b* passes through during interval 33 (FIG. 1G), and pulse 19*b* passes through during interval 34. All the rest of the pulses are blocked out. Each of pulses 18b and 19*b* is delayed by a dealy unit providing a delay time $T_d$ to provide corresponding pulses 18c and 19c (FIG. 1H), which are also supplied to the same OR gate whose output is shown in FIG. 1J.

Basically, the output of the OR gate is a sequence of pairs of pulses 18*x* and 19*x*. Pair 18*x* includes pulses 18*b* and 18*c* while pair 19*x* includes pulses 19*b* and 19*c*. The output of the OR gate is used to control the switching of the magnetization direction to produce the track 20*x* with designations 22*x* and 23*x*, as shown in FIG. 1K. It should be apparent that in the present invention the spurious pulses 25 (FIG. 1D) are blocked out and therefore no spurious designations are produced in the track 20*x*. Therefore, the latter is a true replica of the original servo track 10 which was used as the input to the system.

Figures 2, 3:
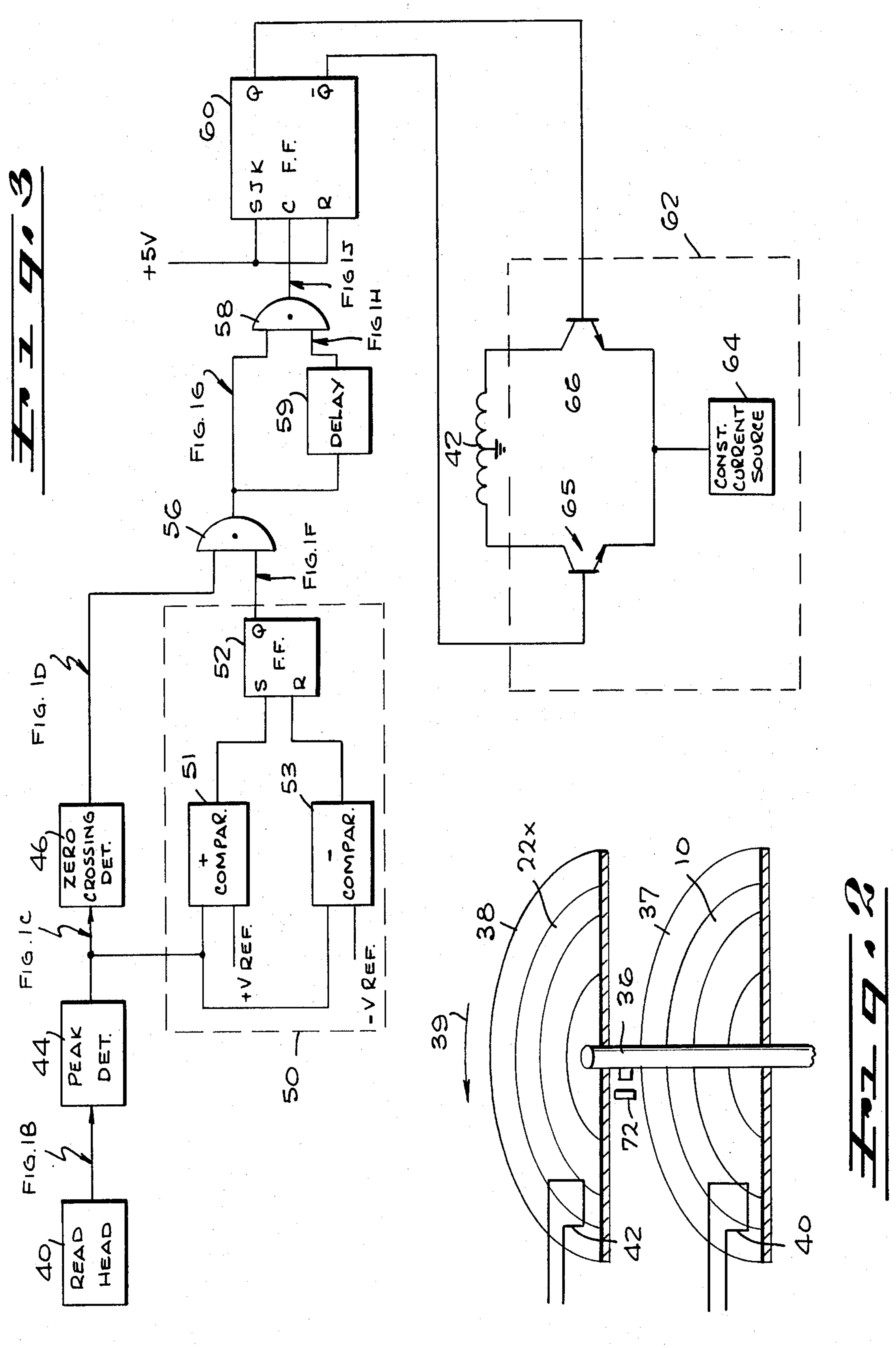
FIGS. 2 and 3 are diagrams useful in explaining the present invention.

Attention is now directed to FIGS. 2 and 3. In FIG. 2 a central shaft 36 is shown supporting a disk 37 on which the servo track 10 is assumed to be prerecorded. The shaft also supports a disk 38 on which servo track 20*x* is to be recorded. The shaft supports the two disks perpendicular to the axis thereof and axially aligned therewith. A motor (not shown) rotates shaft 36 in the direction of arrow 39. A read head 40 and a write head 42 are positioned adjacent disks 37 and 38 respectively. As the disks rotate head 40 reads out track 10 and write head 42 records the replica servo track 20*x*.

As seen from FIG. 3 read head 40 is connected to a peak detector 44 which is in turn connected to a zero crossing detector 46. Also included is a comparator circuit 50, comprising a comparator 51 which sets a flip flop 52 when the peak detector output amplitude exceeds $+V_{REF}$. A comparator 53 resets the flip flop 52 whenever the peak detector output amplitude is less than $-V_{REF}$. Thus, the Q output of the FF52 is as diagrammed in FIG. 1F. The Q output and the output of detector 46 (shown in FIG. 1D) are ANDed by an AND gate 56 whose output, shown in FIG. 1G, is supplied to an OR gate 58. The latter is also supplied with the output of a delay unit 59 which delays each pulse from gate 56 by $T_D$, as shown in FIG. 1H. Thus, the output of gate 58 is the sequence of the pairs of pulses, as shown in FIG. 1J.

The output of OR gate 58 is connected to the clock (C) input of a JK FF 60 whose set (S) and reset (R) inputs are connected to a reference voltage, e.g., +5v. Thus, each pulse from gate 58 causes FF 60 to switch state, thereby causing it to operate as a toggle switch. The Q and $\bar{Q}$ outputs of FF 60 are diagrammed in FIGS. 1L and 1M, respectively.

Connected to the outputs of FF 60 is a dual-emitter-coupled constant current write driver 62, which is in turn connected to write head 42. Driver 62 includes a constant current source 64, which is connected to the emitters of transistors 65 and 66, whose collectors are connected to write head 42. The Q and $\bar{Q}$ outputs of FF 60 are connected to the bases of transistor 66 and 65, respectively. It should thus be apparent that when the Q output is high (true) current flows in head 42 in one direction thereby magnetizing track 20*x* in a first direction, e.g., (+), and then when the Q output is low (false) current flows in the opposite direction and therefore track 20*x* is magnetized in the opposite direction e.g., (−). Thus, each pair of pulses, such as 18*b* and 18*c* causes the formation of a separate designation, such as 22*x* in the servo track 20*x*. From the foregoing description it should thus be appreciated that the system of the present invention enables an existing servo track to be read out and be used as it is read out to record or produce a replica thereof.

It has been discovered that in some cases superior results are achieved only if the supply of the current from source 64 to the emitters of transistors 65 and 66 occurs during a fixed period, hereafter referred to as the write period, which equals a period during which the shaft 36 rotates an integral number of revolutions, so that the current is turned on and off when the same incremental portion of track 20$x$ is at head 42. Also, it was found desirable to turn off the clocking of the write driver by the outputs of FF 60 at a precise instant following the write period after the current falls off to zero. This was found necessary in some instances in order to prevent spurious designations from being recorded in the servo track 20$x$.

In accordance with the present invention the system may include a write control unit 70 (FIG. 4) whose function is to control the supply of the current to the transistors to occur only during the write period and to turn off the clocking of the driver following the write period. In this embodiment a transducer 72, (See FIG. 2) is connected to the shaft 36 so that for each revolution of the shaft the transducer supplies an index pulse to the control unit 70. A sequence of index pulses 81–85 is shown in FIG. 5A. Until a write command pulse 86 (FIG. 5C) is received from an external source, such as a computer, no writing takes place since the constant current source does not supply any current to the transistors. Also the pulses from gate 58 are inhibited from clocking FF 60.

Figure 4:
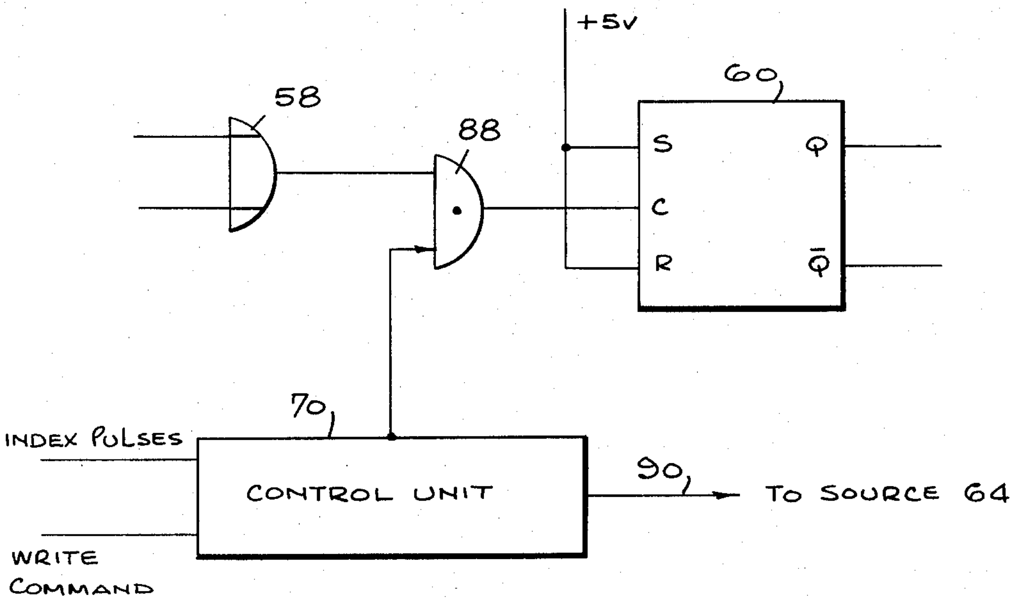
FIG. 4 is a partial block diagram of another embodiment of the invention.
Figure 5:
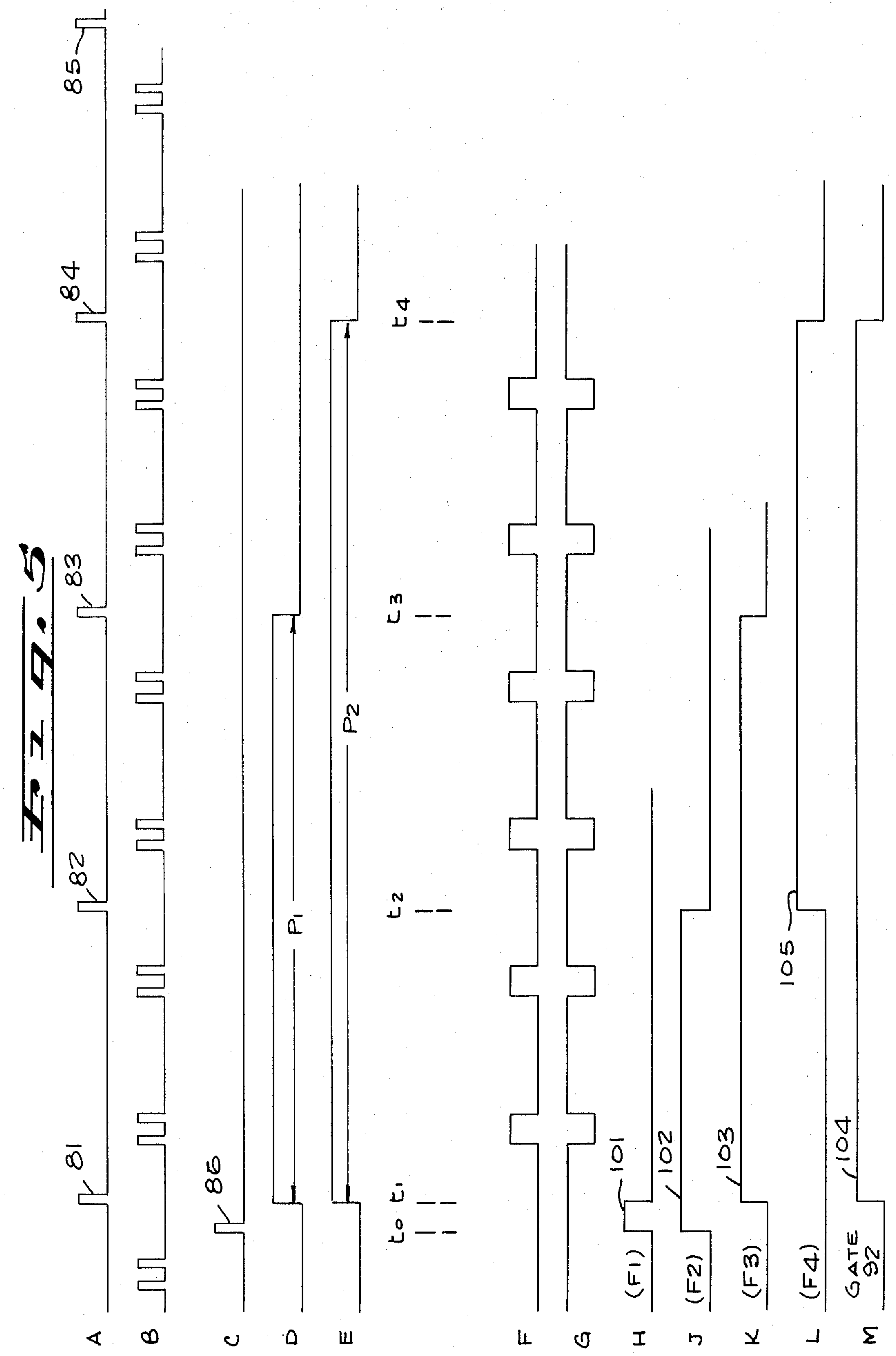
FIG 5 is a multiline waveform diagram useful in explaining the other embodiment.

This may be achieved by introducing an AND gate 88 (see FIG. 4). Gate 88 is enabled by a control unit 70 between gate 58 and FF 60. The output of gate 58 and the Q and $\bar{Q}$ outputs of FF 60 are shown in FIGS. 5B, 5F and 5G. Once the write command pulse 86 is received when the next index pulse, such as pulse 81, is received by unit 70, the latter establishes a write period P1 (FIG. 5D) during which the shaft rotates two full revolutions. The period ends when index pulse 83 is received. The unit 70 also establishes a clocking period P2 (FIG. 5E) during which the shaft rotates three full revolutions. This period ends when index pulse 84 is received.

As shown in FIG. 4, unit 70 is connected to source 64 via line 90. This line is used to enable the source 64 to supply the current to the transistors during the write period P1. Likewise, unit 70 enables gate 88 during the clocking period P2 to permit the pulses from gate 58 to clock FF 60 which in turn clocks or controls the directions of current flow in write head 42. From the foregoing it is thus seen that the current rises and falls when the same incremental portion of the track 20$x$ is at the write head, since the current rises when an index pulse (81) is received and falls off when another index pulse (83) is received, two revolutions later. Also, clocking lasts for an additional full revolution following the two revolution write period to prevent any spurious designations from being recorded, as well as, to prevent undesired designations from being improperly recorded. By extending the write period to two revolutions, the original servo track is actually recorded twice in track 20$x$. This insures optimum results.

Figure 6:
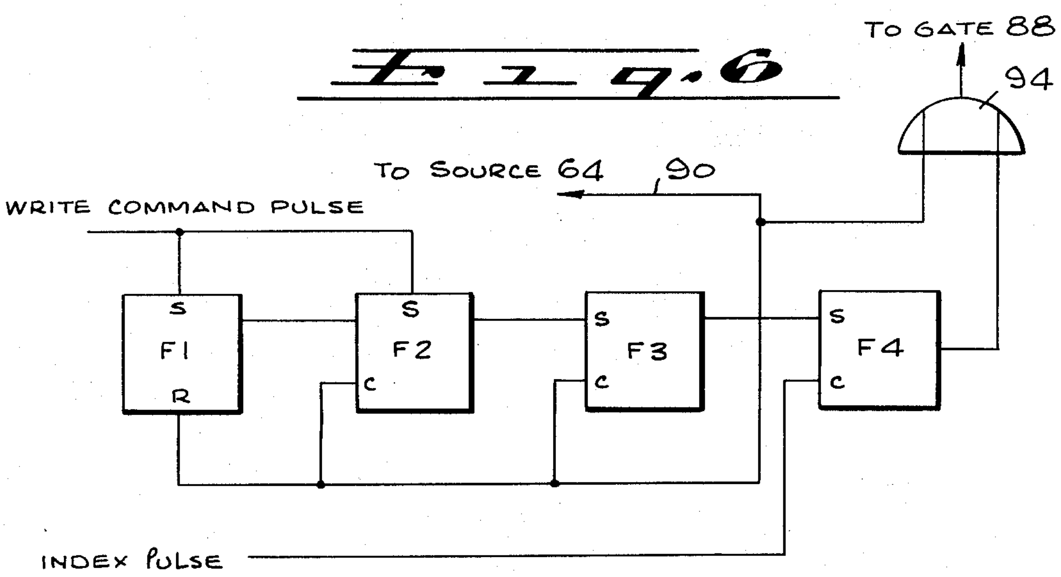
FIG 6 is a block diagram of a control unit, shown in FIG. 4.

It should be apparent to those familiar with logic design that the functions to be performed by unit 70 may be implemented in different ways. For example unit 70 may include four flip flops F1–F4 and an OR gate 94, as shown in FIG. 6. The outputs of the four flip flops and gate 94 are diagrammed in FIGS. 5H–5M. F2–F4 are clocked by the index pulses. F1 and F2 are directly set by the write command pulse at $t_0$, as indicated by numerals 101 and 102. At $t_1$ when index pulse 81 is received, F3 is set as indicated by 103. Since the output of F3 is high the output of gate 92 is high as indicated by numeral 104. Also, when F3 changes state at $t_1$, it directly resets F1. At $t_2$ when index pulse 82 is received, F2 is reset by F1 and F4 is set by F3, as indicated by line 105. At $t_3$ when index pulse 83 is received F3 is reset by F2. Then at $t_4$ when pulse 84 is received F4 is reset by F3. Thus, F3 is set for a two revolution period to define P1. By ORing the outputs of F3 and F4, the output of gate 94 is high for a three revolution period, to define P2.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In combination with a read head means adapted to sense discrete relatively short designations in a magnetized track wherein the track is magnetized in a first direction and the designations are magnetized in a second direction, said read head means providing for each designation a signal with an amplitude which first varies from a zero reference level in a first direction, toward a first peak, thereafter crosses said zero reference level and then varies from the zero reference level in a second direction toward a second peak and returns to said zero reference level to thereby form said first and second peaks of opposite polarities, with respect to said zero reference level, the combination comprising:

a zero crossing detector for providing a first pulse when the amplitude of said signal first varies from said zero reference level in said first direction and a second pulse when said signal amplitude crosses said zero reference level and varies in said second direction;

first means for establishing a time interval which extends from the time when the amplitude of said signal first equals a first reference amplitude which is between said zero reference level and said first peak to the time when the amplitude of said first signals equals a second reference amplitude, which is between said zero reference level and said second peak, said first and second reference amplitudes having opposite polarities with respect to said zero reference level;

gating means coupled to said zero crossing detector and to said first means, said gating means being enabled only during said time interval for providing a first control pulse only in response to said second pulse from said zero crossing detector with said gating means being inhibited from providing a pulse corresponding to said first pulse;

delay means responsive to said first control pulse for providing a second control pulse delayed by a fixed time period from said first control pulse; and utilization means for utilizing said first and second control pulses.

2. A combination as recited in claim 1 wherein said utilization means comprise drive means including a current source and a magnetic write head for controlling the current in said magnetic write head to flow in a first direction in response to the first control pulse and for reversing the direction of current flow in response to the second control pulse.

3. A combination as recited in claim 2 further including a rotatable shaft, a first magnetic disk containing said magnetized track and supported on said shaft so that the read head means sense the directions of magnetization in said magnetized track, a second magnetic disk supported on said shaft with said magnetic write head adjacent a selected track on said second disk, whereby the directions of current in said write head control the directions of magnetization in said selected track.

4. A combination as recited in claim 3 further including transducer means for sensing each complete revolution of said shaft, and control means coupled to said transducer means and to said current source for controlling the latter to provide current to said write head only during an integer number of revolutions of said shaft, the integer number being not less than one.

5. A combination as recited in claim 4 wherein the integer number is at least two.

6. A combination as recited in claim 4 wherein said drive means includes a flip flop which is clocked by said first and second control pulses, said first control pulse clocking said flip flop to a first stable state, whereby said flip flop controls the current in said write head to flow in said first direction, and said second control pulse clocks said flip flop to a second stable state, whereby said flip flop controls the current in said write head to flow in said second direction, said control means further including means inhibiting said flip flop from being clocked by said control pulses after at least one complete revolution of said shaft following the termination of the supply of the current from said source to said write head.

7. A method of transcribing a magnetized track which is magnetized in a first direction except for discrete relatively short designations which are magnetized in a second direction, the steps comprising:

sensing the directions of magnetization in said track by providing for each discrete designation a signal whose amplitude first varies from a zero reference level in a first direction toward a first peak, thereafter changes and crosses said zero reference level and then varies therefrom in a second direction toward a second peak, and thereafter returns to said zero reference level;

generating a pulse each time the signal amplitude changes from said zero reference level, whereby for each signal first and second pulses are generated;

defining a time interval which extends from the time the signal equals a first reference level which has a first polarity with respect to said zero reference level until the time said signal amplitude equals a second reference level which has a second polarity with respect to said zero reference level, with only said second pulse being generated during said time interval;

supplying said first and second pulses to a gating circuit which is enabled only during said time interval, whereby only said second pulse passes through said gating circuit to define a first control pulse;

generating in response to said first control pulse a second control pulse which is delayed a preselected period from said first control pulse;

providing current from a source to a magnetic write head;

controlling the current in said write head to flow in a first direction during the duration between said first and second control pulses, and controlling the current to flow in a second direction following said second control pulse; and moving a magnetizable track past said write head to control the magnetization of said track to be in a first direction or a second direction when the current in the write head flows in the first direction or the second direction, respectively.

8. A method of transcribing a magnetized track as recited in claim 7 wherein said magnetizable track is on a rotatable disk, and wherein said magnetizable current is supplied to said write head only during an integer number of revolutions of said disk.

* * * * *